July 6, 1926.

A. P. JOYNER 1,591,710

ROLLER GUIDE COLLAR FOR WOODWORKING SHAPERS

Filed March 19, 1925

INVENTOR.
ALLAH PERCY JOYNER.
BY Harry C. Schweder
ATTORNEYS.

Patented July 6, 1926.

1,591,710

UNITED STATES PATENT OFFICE.

ALLAH PERCY JOYNER, OF BERKELEY, CALIFORNIA.

ROLLER GUIDE COLLAR FOR WOODWORKING SHAPERS.

Application filed March 19, 1925. Serial No. 16,734.

My invention pertains to roller guide collars for wood working shapers, to prevent wearing of templates used in guiding wood being operated on by the shaper, and to prevent marring of the shape being worked by friction with the rotating parts of the shaper.

My invention comprises mounting a collar on a ball bearing, the latter being constructed with a ball race, partly on the shaper heads and partly on a ring having a partial ball race. The collar has a groove bearing against the balls in the ball race, so that no matter at what speed the shaper heads are rotating, the collar will be made to rotate at the rate caused by the work bearing against the collar being moved through the machine. The collar thus is stationary in its relation to the work, which is placed against the collar.

It is necessary that the ball races maintain a constant position relative to the axis of the driving spindle for the shaper tools, and particularly when templates are used, the accuracy of adjustment must be measured in thousandths of an inch. It is found that if the balls running in the rotating races of the shaper heads are displaced, it allows a very slight displacement of the collar, forming inaccurate work.

One of the features of my invention to secure accuracy of adjustment of the ball races is in using shims or washers of definite thickness to secure the movable collar of the ball race in position. In another form, the movable collar forming the quarter ball race is slidably mounted on the shaper head and has loose fitting screw threads for the purpose of driving the collar on and removing it from the shaper head.

My invention will be more readily understood from the following description, considered in connection with the drawings, in which:—

Figure 1:
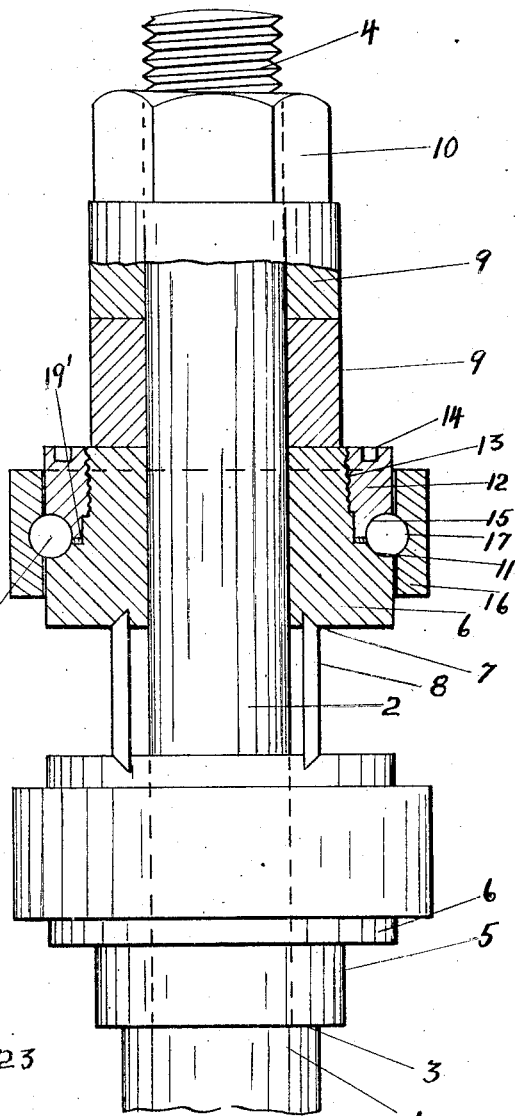
Figure 1 is an elevation with a partial section of my improved shaper head, showing a simple mounting for the anti-friction collar forming the guide collar for the work. This figure illustrates the mounting of the cutting tools and the pair of guide collars.

Referring particularly to Figure 1, the drive spindle 1 has a reduced portion 2, forming a shoulder 3 at the junction, and has its upper end screw threaded as indicated at 4. A collar 5 resting on the shoulder 3 supports the base element 6' of the pair of shaper heads 6. Each shaper head has a pair of transverse grooves 7 in which are secured the cutting blades 8 for turning the various mouldings that are put through the shaper. A pair of filling collars 9 and a nut 10 securely clamp the shaper heads and blades in position.

The guide collars are mounted on the ball bearings on the shaper heads by the following construction. A quarter groove 11 is formed on the shaper head 6, and a ball ring 12, by means of screw threads 13, is fitted on the shaper head, the wrench sockets 14 being used to turn the ball ring. This ring also has a quarter groove 15 forming a ball race. The guide collar 16, has an annular groove 17 forming a ball race and between these three grooves, the balls 18' are secured, forming the anti-friction bearing. Accurately made shims 19' are used to secure the proper adjustment of the ball ring 12 in relation to the grooves 11 and 17.

The manner of use of the shaper head with the guide collar is as follows. In cutting work through a shaper to proper and accurate configuration, it is advisable to use a template, preferably made of metal; and a template is pressed against the guide collars. Although these may be rotating at a very high speed with the shaper head, they are brought to rest in contact with the template, and as the work is slowly pressed or advanced through the shaper, the guide collars slowly revolve but maintaining relative stationary contact with the template. The work piece, if it bears against the guide collars will thus be pressing against a relatively stationary guide, which will prevent a marring or burning of the wood. If the templates are pressed against rotating shaper heads, no matter how accurately they are made, and how smooth the shaper heads are, the template will soon become destroyed.

Figure 2:
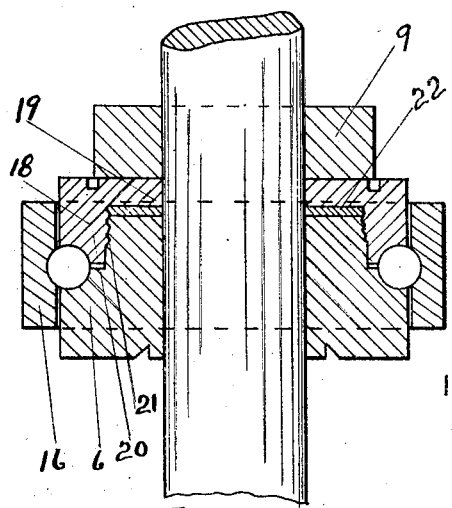
Figure 2 is a modification of Figure 1, in which the accurate adjustment of the ball ring is obtained by shims placed on top of the shaper head.

Referring particularly to Figure 2, the shaper head 6 and the collar 16 are the same as above described. The ball ring 18 is formed with an inwardly extending flange 19. The ball race member 20 is screw threaded on the shaper head 6 as indicated at 21. An accurately made shim or washer 22 fits between the shaper head 6 and the flange 19. The filling collars 9 transmit the clamping pressure from the nut 10 directly onto the upper face of the flange 19, and through the shim 22 to the shaper head 6. By this construction, having accurately made threads 21, the ball races formed by the shaper head, the ball ring and the guide collar may be maintained in definite and accurate adjustment, and the ball ring 18 firmly clamped in position.

Figure 4:
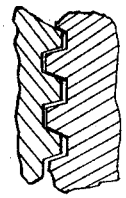
Figure 4 is a detail showing a type of loose fitting threads.
Figure 3:
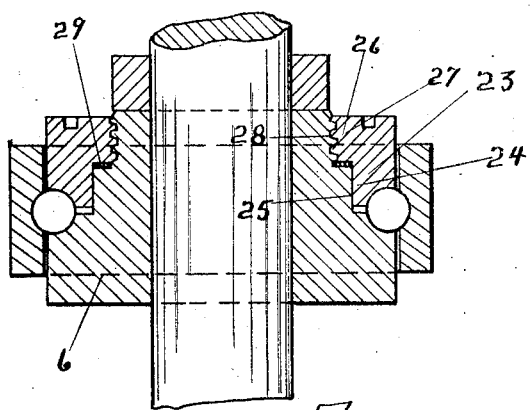
Figure 3 is a section showing a further modification of the guide collar mounting, in which the ball ring has a sliding fit on the shaper head, with loose fitting screw threads.

Referring to the construction of Figures 3 and 4, the ball ring 23 is formed with an accurately tooled and ground bore 24, having a sliding engagement over the turned part 25 of the shaper head. An inwardly extending flange 26 is screw threaded at 27 forming with the screw threads 28 on the shaper head a loose threaded connection. A type of suitable threads are illustrated in Figure 4 in which the loose fit is indicated by the separated faces of the threads. As these threads do not have to center the ball races, and are merely for positioning and withdrawing the ball ring 23, they may have more or less looseness in their fit. A shim 29 is used to separate the ball ring 23 and the shaper head 6.

It will be noted in this type of ball race for the guide collar that if the ball ring is displaced upwardly, or on account of worn threads, becomes pressed more or less towards the axis of rotation, that the guide collar 16 will likewise be displaced towards the axis of rotation instead of being at the true distance for which the machine is set. As the knives are set to cut accurately, it is necessary that the guide collars 16 have their outer surface against which the template bears always maintained at the set distance.

Having described my invention, what I claim is:—

1. A guide collar mounting for shaper heads comprising in combination a shaper head, having a screw threaded thereon and having an inwardly extended flange, a guide collar surounding the shaper head and the ball ring, and anti-friction ball bearings between the shaper head, the ball ring and the guide collar.

2. A guide collar mounting for shaper heads as claimed in claim 6 having in addition an inwardly extending flange on the ball ring, a screw threaded connection between said flange and the shaper head, and a shim between the ball ring and the shaper head.

3. A guide collar mounting comprising a shaper head having a threaded portion and a stem portion with a smooth turned periphery, a ball ring having a smooth turned bore to engage the periphery of said shaper head and a threaded portion to engage the threaded portion of said shaper head, a guide collar surrounding the ball ring and the shaper head, and a ball bearing between the shaper head, the ball ring and the guide collar.

In testimony whereof I affix my signature.

ALLAH PERCY JOYNER.